US012770382B2

(12) United States Patent
Yue et al.

(10) Patent No.: US 12,770,382 B2
(45) Date of Patent: Oct. 20, 2026

(54) METHOD AND SYSTEM FOR SCREENING HIGH DEVELOPMENTAL POTENTIAL EMBRYO FOR IN-VITRO FERTILIZATION

(71) Applicant: SUZHOU BOUNDLESS MEDICAL TECHNOLOGY CO., LTD., Suzhou (CN)

(72) Inventors: Chunfeng Yue, Suzhou (CN); Hang Liu, Suzhou (CN); Zongjie Huang, Suzhou (CN)

(73) Assignee: SUZHOU BOUNDLESS MEDICAL TECHNOLOGY CO., LTD., Suzhou (CN)

( * ) Notice: Subject to any disclaimer, the term of this patent is extended or adjusted under 35 U.S.C. 154(b) by 222 days.

(21) Appl. No.: 18/785,252

(22) Filed: Jul. 26, 2024

(65) Prior Publication Data

US 2024/0420459 A1 Dec. 19, 2024

Related U.S. Application Data

(63) Continuation of application No. PCT/CN2023/072382, filed on Jan. 16, 2023.

(Continued)

(51) Int. Cl.

*G06V 10/80* (2022.01)
*G06V 10/26* (2022.01)

(Continued)

(52) U.S. Cl.

CPC ............ *G06V 10/806* (2022.01); *G06V 10/26* (2022.01); *G06V 10/44* (2022.01);

(Continued)

(58) Field of Classification Search

CPC ... G06V 10/80–817; G06V 10/26–273; G06V 10/82; G06V 10/7715; G06V 10/44;

(Continued)

(56) References Cited

U.S. PATENT DOCUMENTS

| | | | | |
|---|---|---|---|---|
| 10,510,143 | B1 | 12/2019 | Zhou et al. | |
| 2021/0272282 | A1* | 9/2021 | Zaninovic | G16H 50/20 |

(Continued)

FOREIGN PATENT DOCUMENTS

| | | | | |
|---|---|---|---|---|
| CN | 109544512 | A | 3/2019 | |
| CN | 113469958 | A | 10/2021 | |
| CN | 113643302 | A | 11/2021 | |
| CN | 116402830 | A * | 7/2023 | G06V 20/695 |

*Primary Examiner* — Sean T Motsinger

(74) *Attorney, Agent, or Firm* — SZDC Law PC

(57) ABSTRACT

The invention provides a method and system for screening high developmental potential embryo for in-vitro fertilization. The method includes segmenting an embryo from an acquired multi-focus embryo image; segmenting a TE image from the multi-focus embryo image after embryo segmentation, and unfolding the segmented TE image; inputting the multi-focus embryo image after segmentation, the TE image unfolded after the segmentation, the biochemical features of the patient couple and the status features of the maternal uterus into a trained prediction model, and outputting an embryo developmental potential score; and selecting the embryo with the highest score as the high developmental potential embryo. The multi-focus embryo image, the TE image, the biochemical features of the patient couple and the status features of the maternal uterus, are comprehensively considered, and the developmental potential of each embryo is quantified, so that the high developmental potential embryo can be quickly and accurately screened.

8 Claims, 3 Drawing Sheets

Related U.S. Application Data

(60) Provisional application No. 63/306,039, filed on Feb. 2, 2022.

(51) Int. Cl.

| | |
|---|---|
| ***G06V 10/44*** | (2022.01) |
| ***G06V 10/77*** | (2022.01) |
| ***G06V 10/82*** | (2022.01) |
| ***G06V 20/69*** | (2022.01) |
| *G06V 10/10* | (2022.01) |

(52) U.S. Cl.

CPC .......... *G06V 10/7715* (2022.01); *G06V 10/82* (2022.01); *G06V 20/695* (2022.01); *G06V 10/10* (2022.01); *G06V 2201/03* (2022.01)

(58) Field of Classification Search

CPC .. G06V 10/10; G06V 20/695; G06V 2201/03; G06T 2207/30044

See application file for complete search history.

(56) References Cited

U.S. PATENT DOCUMENTS

| | | | | |
|---|---|---|---|---|
| 2022/0392062 | A1* | 12/2022 | Chavez Badiola .... | G06V 10/26 |
| 2023/0018456 | A1* | 1/2023 | Erlich .................... | G06N 3/084 |
| 2024/0249142 | A1* | 7/2024 | Erlich ...................... | G06N 3/09 |
| 2024/0312560 | A1* | 9/2024 | Casper ................... | G06V 10/82 |
| 2024/0354935 | A1* | 10/2024 | Tokisue ................. | G01N 21/17 |

* cited by examiner

METHOD AND SYSTEM FOR SCREENING HIGH DEVELOPMENTAL POTENTIAL EMBRYO FOR IN-VITRO FERTILIZATION

This application is a Continuation Application of PCT/CN2023/072382, filed on Jan. 16, 2023, which claims priority to U.S. Provisional Patent Application No. 63/306,039, filed on Feb. 2, 2022, which is incorporated by reference for all purposes as if fully set forth herein.

FIELD OF THE INVENTION

The present invention relates to the technical field of embryo screening, in particular to a method and system for screening high developmental potential embryo for in-vitro fertilization.

DESCRIPTION OF THE RELATED ART

Infertility is a global public health problem, affecting more than 48.5 million couples around the world. Since the birth of the first in vitro fertilization (IVF) baby in 1978, more than 8 million children have received IVF treatment. In Canada, 35000IVF treatment cycles are performed every year, and there are more than 1.5 million treatment cycles in the world, increasing by more than 10% every year. However, in the past few decades, the live birth ratio of in vitro fertilization has remained around 30%, and it varies from clinic to clinic. This is because most in vitro fertilization procedures rely heavily on the experience of clinical staff and involve significant subjectivity and inconsistency. For a long time, IVF organizations have been hoping to use data-driven quantitative methods to transform and standardize IVF procedures.

In order to achieve this goal, artificial intelligence (AI) technology will play a key role. For example, in semen analysis, artificial intelligence can analyze the image of a single sperm and quantitatively classify it into a normal and abnormal sperm, thus providing a more accurate diagnosis of male infertility and guiding subsequent treatment schemes. AI can also predict the DNA quality of a sperm from sperm images, so as to select the high-quality sperm for intracytoplasmic sperm injection (ICSI).

Among all the factors that affect the outcome of IVF, the quality of the transplanted embryo selected (i.e., developmental potential) is the main factor that determines the success of IVF. The existing methods for evaluating and selecting embryos are based on artificial observation of embryo morphology. Artificial judgment only examines a limited number of morphological features (i.e., the size of the embryo cavity, the number of cells in the inner cell mass (ICM) and the number of cells in the trophectoderm (TE)) to "grade" embryos (Human reproduction, p 26, 1270-1283). This method has two obvious limitations. First, other morphological features, such as the shape and size of cells in ICM (the structure that develops into a fetus), also reflect the developmental potential of embryos, but they have not been considered in the current embryo grading methods. Second, the developmental potential of embryos is not completely determined by morphological features. Biochemical information/features related to patients also greatly affect the developmental potential of embryos. For example, the age, hormone level and sperm quality (such as DNA fragmentation index (DFI)) of patients also seriously affect embryo development in vivo. These biochemical features cannot be reflected by embryo morphology, and are also missing in the current embryo evaluation practice. IVF treatment needs a data-driven embryo selection/evaluation method, which considers comprehensive embryo morphological features and patient information to select embryos with the highest developmental potential for transplantation.

SUMMARY OF THE INVENTION

Therefore, a technical problem to be solved by the present invention is to provide a method for screening high developmental potential embryo for in-vitro fertilization with high accuracy.

In order to solve the technical problem above, the present invention provides a method for screening high developmental potential embryo for in-vitro fertilization, including the steps of:

segmenting an embryo from an acquired multi-focus embryo image;

segmenting a TE image from the multi-focus embryo image after the embryo segmentation, and unfolding the segmented TE image;

inputting the multi-focus embryo image after the embryo segmentation, the TE image unfolded after the segmentation, the biochemical features of the patient couple and the status features of the maternal uterus into a trained prediction model, and outputting an embryo developmental potential score; and selecting the embryo with the highest score as the high developmental potential embryo.

In one embodiment of the present invention, the segmentation of the embryo from the acquired multi-focus embryo image includes:

binarizing the image at each focal plane in the obtained multi-focus embryo image to obtain a rough mask;

refining the rough mask;

extracting all outlines by using the refined mask; and retaining the white pixel with the largest outline to achieve embryo segmentation.

In one embodiment of the present invention, the prediction model includes a CNN network, an attention module, a Vit network, a multi-layer perceptron and a score fusion module;

wherein the CNN network is used to predict an embryo developmental potential score from the multi-focus embryo image after the embryo segmentation, and the attention module is used to generate a weight of the embryo developmental potential score obtained from the multi-focus embryo image, and a weighted sum of all the embryo developmental potential scores is taken as an embryo developmental potential score predicted from the multi-focus image;

the Vit network is used to generate an embryo developmental potential score from the TE image unfolded after the segmentation;

the multi-layer perceptron is used to generate an embryo developmental potential score from the biochemical features of the patient couple and the status features of the maternal uterus; and the score fusion module is used to integrate the three embryo developmental potential scores predicted from the multi-focus embryo image after the embryo segmentation, the TE image unfolded after the segmentation, the biochemical features of the patient couple and the status features of the maternal uterus, respectively, and output a final embryo developmental potential score.

In one embodiment of the present invention, the attention module generates the weight through sequential convolution, average combination and S-type operation performed on a highest level feature map in the CNN network.

In one embodiment of the present invention, the biochemical features of the patient couple include:

paternal semen features;

maternal age, body mass index and treatment history;

the days of blastocyst transfer, the number of antral follicles and the number of recovered oocytes; and maternal hormone spectrum;

and the status features of the maternal uterus include endometrial thickness and endometrial type.

In one embodiment of the present invention, before segmenting the embryo from the acquired multi-focus embryo image the method further includes:

changing focal planes along the Z-axis of a microscope, capturing embryo images at a plurality of focal planes, and constructing a multi-focus embryo image.

In one embodiment of the present invention, the unfolding the segmented TE image includes unfolding the segmented TE image through polar coordinate deformation.

The present invention also provides a computer device, including a memory, a processor, and a computer program stored in the memory and executable on the processor, wherein when the processor executes the program, the steps of the method according to any one of the above are achieved.

The present invention also provides a computer-readable storage medium on which a computer program is stored, wherein the program, when executed by the processor, achieves the steps of the method according to any one of the above.

The present invention also provides a system for screening high developmental potential embryo for in-vitro fertilization, including a first segmentation module for segmenting an embryo from an acquired multi-focus embryo image;

a second segmentation module for segmenting a TE image from the multi-focus embryo image after the embryo segmentation, and unfolding the segmented TE image;

a model prediction module for inputting the multi-focus embryo image after the embryo segmentation, the TE image unfolded after the segmentation, the biochemical features of the patient couple and the status features of the maternal uterus into a trained prediction model, and outputting an embryo developmental potential score; and a selection module for selecting the embryo with the highest score as the high developmental potential embryo.

Compared with the prior art, the technical solution of the present invention has the following advantages:

According to the method and system for screening high developmental potential embryo for in-vitro fertilization of the present invention, three aspects, i.e., the multi-focus embryo image after the embryo segmentation, the TE image unfolded after the segmentation, the biochemical features of the patient couple and the status features of the maternal uterus, are comprehensively considered, and the developmental potential of each embryo in a plurality of embryos of the same patient is quantified from a plurality of aspects, so that the high developmental potential embryo can be quickly and accurately screened.

The above description is only an overview of the technical scheme of the present invention. In order to clearly understand the technical means of the present invention so as to be capable of implementing them according to the contents of the specification, and to make the above and other objects, features and advantages of the present invention more obvious and easier to understand, preferred examples are given particularly in the following with the accompanying drawings, and the detailed description is as follows.

BRIEF DESCRIPTION OF THE DRAWINGS

In order to make the contents of the present invention more clearly understood, the present invention will be further described in detail according to specific examples of the present invention and with the accompanying drawings, in which.

Figure 1:
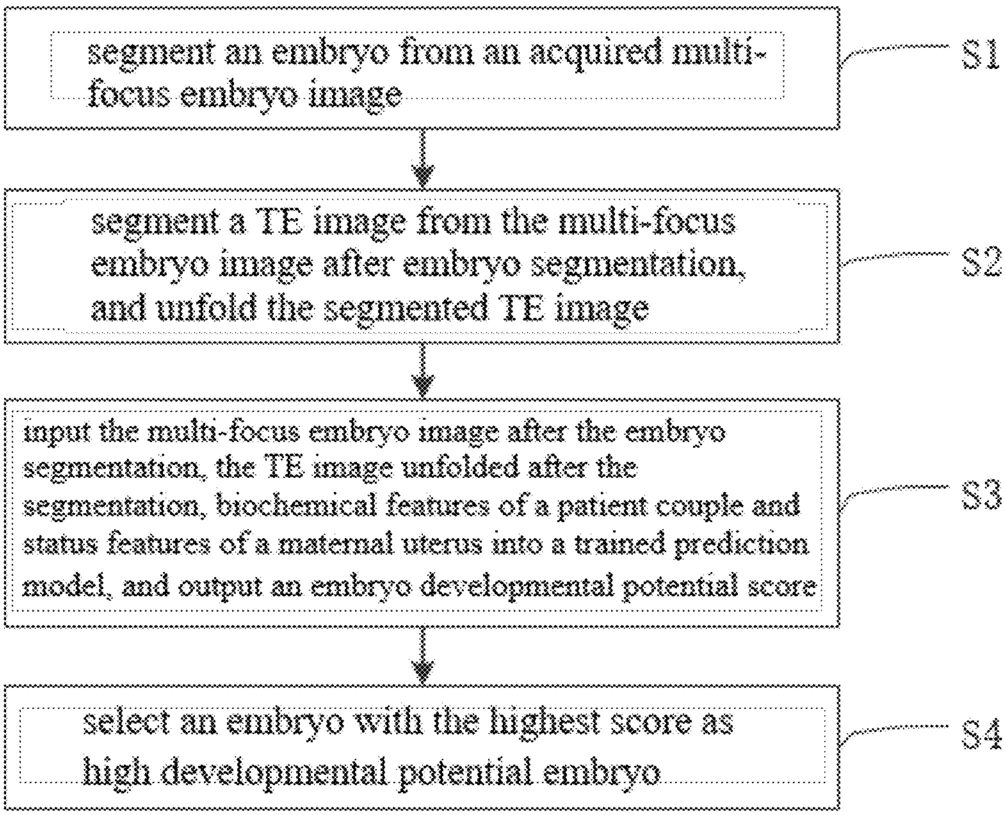
FIG. 1 is a flowchart of a method for screening high developmental potential embryo for in-vitro fertilization in an embodiment of the present invention.

Reference numerals: 201. microscope; 202. embryo container; 203. objective lens; 204. focusing motor; 205. vibration isolator; 206. image acquisition unit; 207. electric locator; 208. host computer.

DETAILED DESCRIPTION OF THE PREFERRED EMBODIMENTS

The present invention will be further described with the attached drawings and specific examples, so that those skilled in the art can better understand and implement the present invention, but the examples given are not taken as limitations of the present invention.

Embodiment 1

Referring to FIG. 1, this embodiment provides a method for screening high developmental potential embryo for in-vitro fertilization, including the following steps:

Step S1, segmenting an embryo from an acquired multi-focus embryo image;

and optionally, the following steps are further included before Step S1:

changing focal planes along the Z-axis of a microscope, capturing embryo images at multiple focal planes, and constructing a multi-focus embryo image.

Wherein, the multi-focus embryo image is captured by a camera mounted on the microscope. The microscope is provided with a focusing motor controlled by a computer, which is used to change focal planes along the Z-axis of the microscope while capturing multi-focus embryo images.

Figure 2:
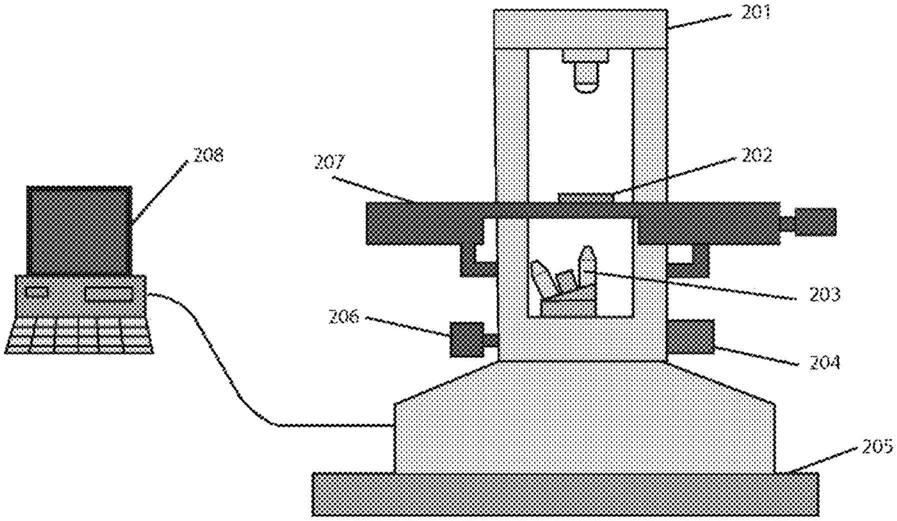
FIG. 2 is a schematic diagram of the hardware used to obtain multi-focus embryo images in an embodiment of the present invention.

Referring to FIG. 2, in one embodiment, the hardware used to obtain multi-focus embryo images is as follows:

a microscope 201, for example an inverted optical microscope, which may also include a differential interference contrast (DIC) or a phase contrast optical devices;

a host computer 208, which may include software and a processor with instructions for controlling elements of the system and image processing, the instructions include controlling a focusing motor 204 to change focal planes along the Z-axis of the microscope, and controlling an image acquisition unit 206 to capture the images of the focal planes; retrieving the biochemical features of a patient couple and the status features of a maternal uterus from an interface or a database; and predicting embryo developmental potential and training an embryo development prediction model;

an electric locator 207 for controlling the movement of an embryo container 202 to locate an embryo in the center of the field of view, which is operatively connected or linked to the host computer 208 through wired connection or wireless connection;

an objective lens 203 having a high magnification (e.g., 100×);

an image acquisition unit 206, for example a CCD camera, which can be mounted on the microscope 201 and operatively connected or linked to the host computer 208 through wired connection or wireless connection;

a focusing motor 204, which can be mounted on a focusing knob and connected to the host computer 208 through wired connection or wireless connection; and an embryo container 202, which may contain a plurality of embryos of the same patient, and the electric locator 207 may be controlled by the host computer 208 to locate each embryo in the field of view. Further, a vibration isolator 205 may be included to minimize the vibration of the microscope 201, the electric locator 207 and the image acquisition unit 206.

The diameter of a blastula is 100-200 microns, which exceeds the depth of field of the microscope. Therefore, the embryo image captured at a single focal plane only partially reveals the morphological features of the embryo. The present invention proposes use of embryo images captured from a plurality of focal planes, these images include more comprehensive morphological features of an embryo and can predict the developmental potential of the embryo more accurately.

A stack of multi-focus embryo images can be automatically captured by a computer-controlled camera (206) and a computer-controlled focus adjustment motor (204) mounted on the microscope (201). The computer controls the focusing motor to set the focal planes of the microscope to a series of predetermined values, and controls the camera to capture images at each focal plane, to construct a stack of the multi-focus embryo images.

Figure 3:
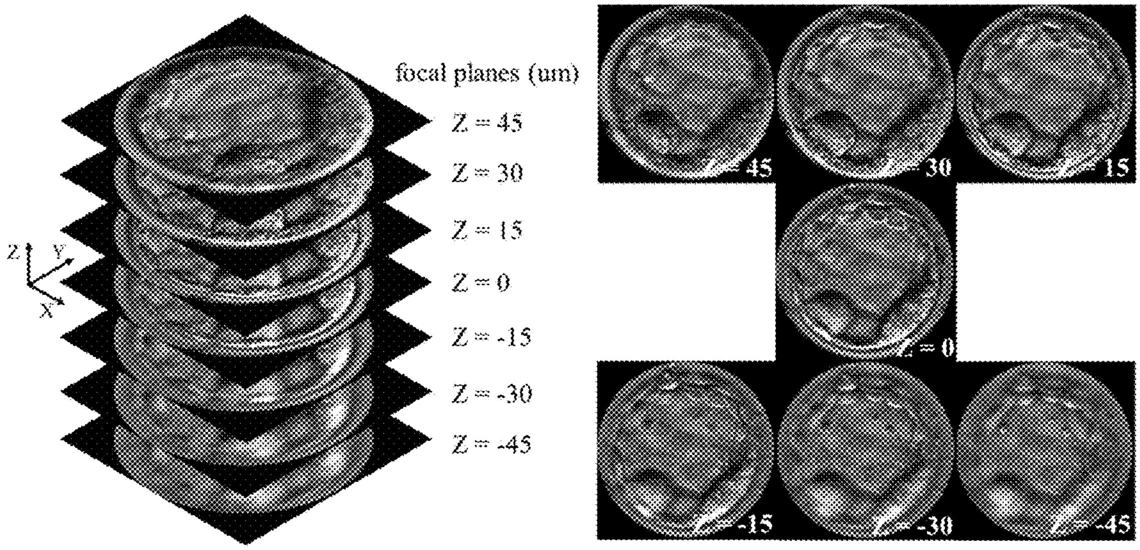
FIG. 3 is a schematic diagram of the multi-focus embryo image obtained in an embodiment of the present invention.

Referring to FIG. 3, it is an example of a stack of multi-focus embryo images captured at seven different focal planes ranging from −45 microns to 45 microns along the Z-axis of a microscope. Compared with a single image captured at a single focal plane, a stack of embryo images reveals more morphological features of the embryo. For example, an inner cell mass (red circle) is visible in the stack of embryo images (at the focal plane of Z=45). However, it is invisible or less visible in other images from a single focal plane (e.g., at the focal planes of Z=−15, −30, and −45), because it is defocused.

Figure 4:
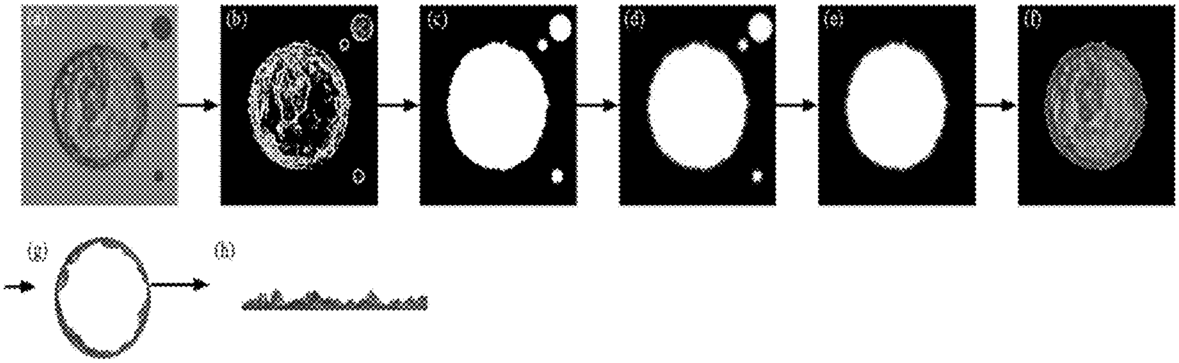
FIG. 4 is a schematic diagram shows segmenting a TE image from the multi-focus embryo image after embryo segmentation, and unfolding the segmented TE image in an embodiment of the present invention.

Referring to FIG. 4, in one embodiment, Step S1 includes binarizing the image at each focal plane in the obtained multi-focus embryo image (refer to FIG. 4(*a*)) to obtain a rough mask (refer to FIG. 4(*b*)); wherein, all the white pixels are embryos or cell fragments, and the black pixels represent embryos, cell fragments and background;

refining the rough mask (refer to FIG. 4(*c*)); optionally, refining the rough mask by using the GrubCut segmentation algorithm;

extracting all outlines by using the refined mask (refer to FIG. 4(*d*)); and retaining the white pixel with the largest outline (refer to FIG. 4(*e*)) to achieve embryo segmentation (refer to FIG. 4(*f*)).

Step S2, segmenting a TE image from the multi-focus embryo image after the embryo segmentation (refer to FIG. 4(*g*)), and unfolding the segmented TE image (refer to FIG. 4(*h*)); optionally, unfolding the segmented TE image through polar coordinate deformation.

As shown in FIG. 3, the images captured from a single focal plane only include in-focus morphological features, while morphological features out of focus are mostly lost. Therefore, the present invention uses a stack of images captured from different focal planes to include more comprehensive morphological features as model inputs.

Figure 5:
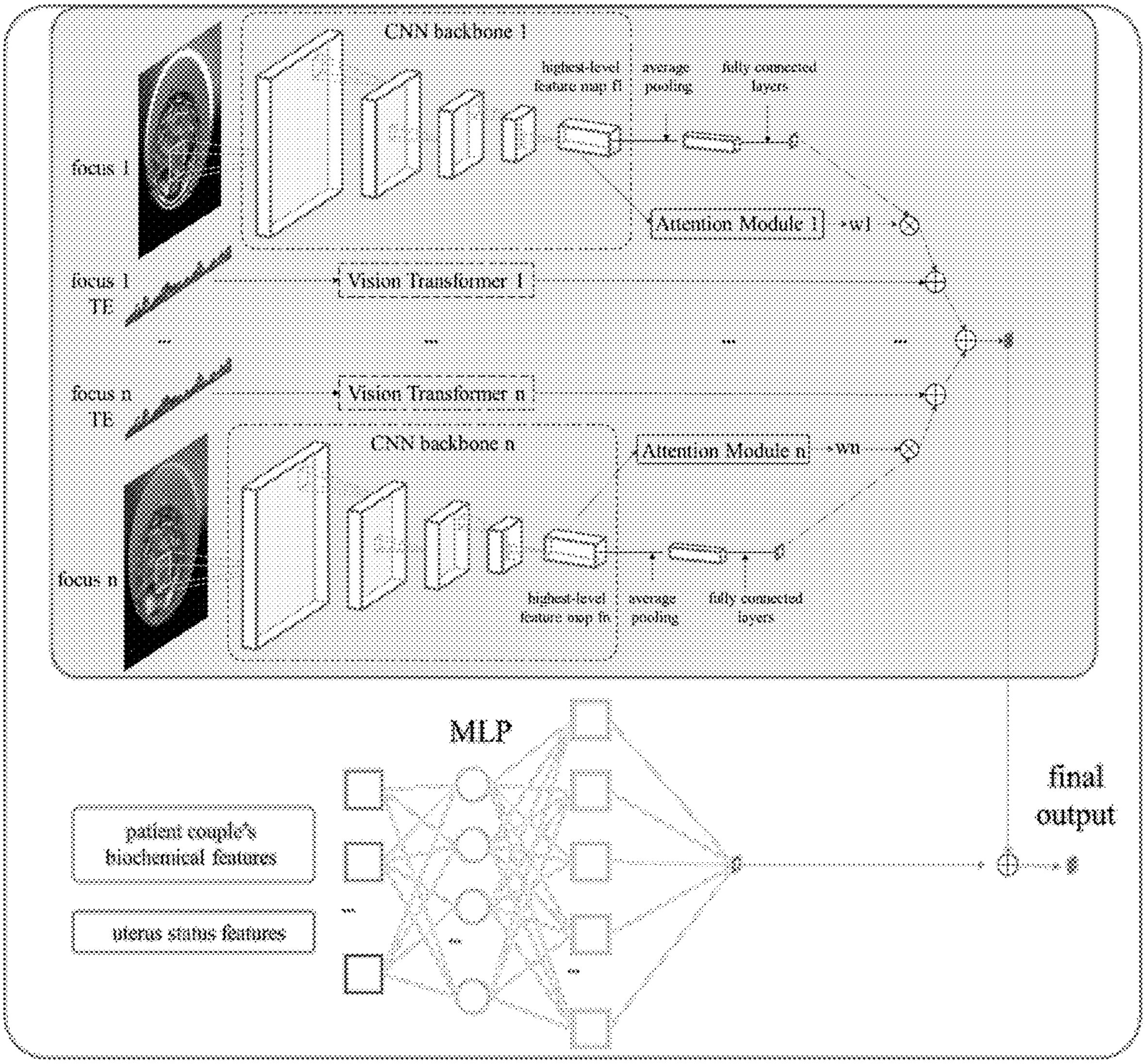
FIG. 5 is a schematic diagram of the prediction model in an embodiment of the present invention.

Step S3, inputting the multi-focus embryo image after the embryo segmentation, the TE image unfolded after the segmentation, the biochemical features of the patient couple and the status features of the maternal uterus into a trained prediction model, and outputting an embryo developmental potential score;

referring to FIG. 5, in one embodiment, the prediction model includes a CNN network, an attention module, a Vit network (vision transformer), a multi-layer perceptron (MLP) and a score fusion module.

The CNN network is the most advanced method to solve problems of image-based classification. The existing cellular neural networks use feature concatenation or the majority voting method to make classification decisions using a plurality of input images. However, in a stack of embryo images, the cells in the embryo have different sizes. Large cells can appear in a plurality of focal planes, while small cells may only appear in a single focal plane. Therefore, directly concatenating features extracted from multi-focus embryo images will undesirably enhance features from large cells and weaken features from small cells. In a majority voting method, the prediction results from multi-focus embryo images are weighted equally. However, the present invention finds that multi-focus embryo images contribute differently to the prediction of embryo developmental potential.

Therefore, in the present invention, the CNN network predicts embryo developmental potential scores from the multi-focus embryo images after the embryo segmentation, and the attention module is used to generate weights for the embryo developmental potential scores obtained from the multi-focus embryo images, and the weighted sum of all the embryo developmental potential scores is taken as an embryo developmental potential score predicted from the multi-focus images; specifically, the attention module generates the weight through sequential convolution, average combination and S-type operation performed on a highest level feature map in the CNN network. Because the highest level feature map is directly related to the embryo developmental potential score, it is used to generate the weight.

The Vit network is used to generate an embryo developmental potential score from the TE image unfolded after the segmentation; the morphological features of TE cells are important prediction indicators of embryo developmental potential. However, TE cells occupy a narrow annular band in the outer layer of embryo images, and CNN does not perform well in dealing with such features. Therefore, in the present invention, TE is segmented from the embryo image. The TE image is unfolded into an elongated rectangular shape, and the unfolded TE image is processed by Vit. The reason why Vit is selected instead of CNN in the present invention is that Vit has a self-attention mechanism, which enables it to more accurately capture the cohesion (and compactness) of TE cells to predict the embryo developmental potential.

The multi-layer perceptron is used to generate an embryo developmental potential score from the biochemical features of the patient couple and the status features of the maternal uterus.

The biochemical features of patients which cannot be displayed in embryo images are also very important for predicting embryo developmental potential. The biochemical features of the patient include paternal semen features (e.g., original semen volume, A-level sperm ratio after semen treatment and sperm DNA fragment index); maternal age, body mass index and treatment history; the days of blastocyst transfer, the number of antral follicles and the number of oocytes obtained; and maternal hormone spectrum (such as progesterone, estradiol, luteinizing hormone and free thyroxine). The status features of the maternal uterus include endometrial thickness and endometrial type.

The model input also includes the status of the maternal uterus to help prevent biased/false labeling, that is, to alleviate the influence of poor uterus status on biased embryo evaluation in the case of implantation failure.

Therefore, in addition to morphological features, adding the biochemical features related to patients can reveal the embryo developmental potential more comprehensively. As we all know, with the increase of women's age, the frequency of genetic abnormalities in oocytes will also increase, thus reducing the developmental potential of embryos and leading to adverse clinical results. A sperm DFI reflects the damage degree of sperm DNA. The embryo developed after fertilization of oocytes with a sperm with a high DFI has low developmental potential and poor clinical outcome.

At the same time, the status features of a uterus (i.e., endometrial thickness and endometrial type) are added to the model input. When an embryo with high developmental potential is transplanted into a uterus with poor status, the poor clinical outcome (failure) can be attributed to the poor uterus status. Therefore, including the status features of a uterus help prevent biased/false labeling, that is, to alleviate the influence of poor uterus state on biased embryo evaluation in the case of implantation failure.

In order to combine biochemical features and status features of a maternal uterus into model inputs, the present invention integrates digital features (biochemical features and status features of a uterus) with CNN and Vit; therefore, biochemical features, status features of a maternal uterus, a stack of embryo images and TE images are considered together for evaluating the embryo. Classical methods such as the decision tree and SVM are not suitable for processing biochemical features here because they cannot be easily integrated with CNN and Vit. On the contrary, a multi-layer perceptron (MLP) can be used, which predicts an embryo developmental potential score according to biochemical features and status features of a maternal uterus.

The score fusion module is used to fuse the three embryo developmental potential scores predicted from the multi-focus embryo image after the embryo segmentation, the TE image unfolded after the segmentation, the biochemical features of the patient couple and the status features of the maternal uterus, respectively, and output a final embryo developmental potential score.

Specifically, the embryo developmental potential score predicted according to the multi-focus embryo image, the embryo developmental potential score predicted according to TE, and the embryo developmental potential score predicted according to the biochemical features and status features of the uterus are added, and a constant value is taken as the final developmental potential score. A constant value is calculated as $-\ln(a)$, where a is the ratio of embryos with positive clinical results to those with negative clinical results. The constant values are used to alleviate the model prediction bias of negative clinical results, which constitute most (for example, 70%) of the data set used to train the model.

Step S4, selecting the embryo with the highest score as the high developmental potential embryo.

In addition, when the proposed embryo selection method is applied to different IVF clinics, the number of biochemical features of patient and status features of uterus that can be used in this method may be different. In order to adapt the proposed method to this situation, different combinations are used to train the biochemical features and status features of uterus of a group of model patients, and then the model that matches the available biochemical features of patient and status features of uterus is selected to predict embryonic developmental potential.

Embodiment 2

The present invention provides a computer device, including a memory, a processor, and a computer program stored in the memory and executable on the processor. When the processor executes the program, the steps of the method in Embodiment 1 are achieved.

Embodiment 3

The present invention provides a computer-readable storage medium on which a computer program is stored. The program, when executed by the processor, achieves the steps of the method in Embodiment 1.

Embodiment 4

The present invention provides a system for screening high developmental potential embryo for in-vitro fertilization, including

- a first segmentation module for segmenting an embryo from an acquired multi-focus embryo image;
- a second segmentation module for segmenting a TE image from the multi-focus embryo image after the embryo segmentation, and unfolding the segmented TE image;
- a model prediction module for inputting the multi-focus embryo image after the embryo segmentation, the TE image unfolded after the segmentation, the biochemical features of the patient couple and the status features of the maternal uterus into a trained prediction model, and outputting an embryo developmental potential score; and
- a selection module for selecting the embryo with the highest score as the high developmental potential embryo.

The system for screening high developmental potential embryo for in-vitro fertilization in the embodiments of the present invention is used to achieve the method for screening high developmental potential embryo for in-vitro fertilization, so the specific embodiment of the system can be found in the example part of the method for screening high developmental potential embryo for in-vitro fertilization as described previously. Therefore, the specific embodiment of the system can refer to the description of the corresponding examples of various parts, and will not be introduced here.

In addition, since the system for screening high developmental potential embryo for in-vitro fertilization in this embodiment of the present invention is used to achieve the method for screening high developmental potential embryo for in-vitro fertilization, the function of the screening system corresponds to that of the above method, which will not be described here.

It should be understood by those skilled in the art that embodiments of the present application can be provided as a method, a system, or a computer program product. Therefore, the present application can take the form of an entire hardware example, an entire software example, or an example combining software and hardware aspects. Moreover, the present application can take the form of a computer program product implemented on one or more computer-usable storage media (including but not limited to a disk memory, CD-ROM, an optical memory, etc.) comprising computer-usable program codes.

The present application is described with reference to flowcharts and/or block diagrams of methods, apparatuses (systems), and computer program products according to examples of the present application. It should be understood that each flow and/or block in the flowcharts and/or block diagrams, as well as combinations of the flow and/or block in the flowcharts and/or block diagrams can be achieved by computer program instructions. These computer program instructions may be provided to the processor of a general computer, a special computer, an embedded processor or other programmable data processing apparatuses to produce a machine, such that the instructions executed by the processor of the computer or other programmable data processing apparatuses produce devices for achieving the functions specified in a flow or flows in the flowchart and/or a block or blocks in the block diagram.

These computer program instructions may also be stored in a computer-readable memory that can direct a computer or other programmable data processing apparatuses to function in a particular manner, such that the instructions stored in the computer-readable memory produce an article of manufacture including an instruction device that achieve the functions specified in a flow or flows in the flowchart and/or a block or blocks in the block diagram.

These computer program instructions may also be loaded onto a computer or other programmable data processing apparatuses, such that a series of operational steps are carried out on the computer or other programmable apparatuses to produce a computer-achieved process, such that the instructions executed on the computer or other programmable apparatuses provide steps for achieving the functions specified in a flow or flows in the flowchart and/or a block or blocks in the block diagram.

Obviously, the embodiments above are only examples for clear explanation, not limitation of the invention. For those of ordinary skill in the art, other changes or variations in different forms can be made on the basis of the above description. It is not necessary and impossible to exhaust all the embodiments here. The obvious changes or variations derived therefrom are still within the scope of protection created by the present invention.

What is claimed is:

1. A method for screening high developmental potential embryo for in-vitro fertilization, comprising steps of:

segmenting an embryo from an acquired multi-focus embryo image;

segmenting a trophectodern (TE) image from the multi-focus embryo image after embryo segmentation, and unfolding the segmented TE image;

inputting the multi-focus embryo image after the embryo segmentation, the TE image unfolded after the segmentation, biochemical features of a patient couple and status features of a maternal uterus into a trained prediction model, and outputting an embryo developmental potential score; and selecting an embryo with the highest score as the high developmental potential embryo, wherein the prediction model comprises a convolutional neural network (CNN) network, an attention module, a vision transformer (Vit) network, a multi-layer perceptron and a score fusion module;

wherein the CNN network predicts an embryo developmental potential score from the multi-focus embryo image after the embryo segmentation, and the attention module is used to generate a weight of the embryo developmental potential score obtained from the multi-focus embryo image, and a weighted sum of all embryo developmental potential scores is taken as an embryo developmental potential score predicted from the multi-focus image;

the Vit network is used to generate an embryo developmental potential score from the TE image unfolded after the segmentation;

the multi-layer perceptron is used to generate an embryo developmental potential score from the biochemical features of the patient couple and the status features of the maternal uterus; and the score fusion module is used to fuse three embryo developmental potential scores predicted from the multi-focus embryo image after the embryo segmentation, the TE image unfolded after the segmentation, the biochemical features of the patient couple and the status features of the maternal uterus, respectively, and output a final embryo developmental potential score.

2. The method according to claim 1, wherein the segmenting the embryo from the acquired multi-focus embryo image comprises:

binarizing an image at each focal plane in the acquired multi-focus embryo image to obtain a rough mask;

refining the rough mask;

extracting all outlines by using the refined mask; and retaining a white pixel with the largest outline to achieve embryo segmentation.

3. The method according to claim 1, wherein the attention module generates the weight through sequential convolution, average combination and S-type operation performed on a highest level feature map in the CNN network.

4. The method according to claim 1, wherein the biochemical features of the patient couple comprise:

a paternal semen feature;

maternal age, body mass index and treatment history;

days of blastocyst transfer, the number of antral follicles and the number of recovered oocytes; and maternal hormone spectrum;

and the status features of the maternal uterus comprise endometrial thickness and endometrial type.

5. The method according to claim 1, wherein before segmenting the embryo from the acquired multi-focus embryo image, the method further comprises:

changing focal planes along a Z-axis of a microscope, capturing embryo images at a plurality of focal planes, and constructing a multi-focus embryo image.

6. The method according to claim 1, wherein the unfolding the segmented TE image comprises unfolding the segmented TE image through polar coordinate deformation.

7. A computer device, comprising a memory, a processor, and a computer program stored in the memory and executable on the processor, wherein when the processor executes the program, the steps of the method according to claim 1 are achieved.

8. A non-transitory computer-readable storage medium on which a computer program is stored, wherein the program, when executed by the processor, achieves the steps of the method according to claim 1.

* * * * *